United States Patent
Huber

(10) Patent No.: US 6,902,202 B2
(45) Date of Patent: Jun. 7, 2005

(54) METHOD AND DEVICE FOR CONNECTING PARTS OF AN EXHAUST GAS SYSTEM

(75) Inventor: Maximilian Huber, Linkenheim (DE)

(73) Assignee: IWKA Balg- und Kompensatoren-Technologie GmbH, Stutensee (DE)

( * ) Notice: Subject to any disclaimer, the term of this patent is extended or adjusted under 35 U.S.C. 154(b) by 0 days.

(21) Appl. No.: 10/298,662

(22) Filed: Nov. 19, 2002

(65) Prior Publication Data

US 2003/0102666 A1 Jun. 5, 2003

(30) Foreign Application Priority Data

Nov. 30, 2001 (DE) .......................................... 101 58 877

(51) Int. Cl.⁷ ................................................ F16L 27/10
(52) U.S. Cl. ................. 285/226; 285/288.2; 29/890.14
(58) Field of Search ............................... 285/226, 227, 285/228, 229, 288.2, 288.9, 288.3, 288.4, 288.6, 288.11; 29/890.14

(56) References Cited

U.S. PATENT DOCUMENTS

| 3,169,785 A | * | 2/1965 | Ziebold ...................... 285/226 |
| 3,574,361 A | * | 4/1971 | Contreras et al. ............ 285/226 |
| 4,204,707 A | * | 5/1980 | Lincicome et al. .......... 285/114 |
| 5,112,088 A | * | 5/1992 | Moore et al. ................ 285/114 |
| 5,299,841 A | * | 4/1994 | Schaefer ...................... 285/299 |
| 5,534,676 A | * | 7/1996 | Rinaldi et al. .......... 219/124.34 |
| 5,542,715 A | * | 8/1996 | Mantoan et al. ............. 285/226 |
| 5,813,704 A | * | 9/1998 | Naito .......................... 285/226 |
| 6,415,603 B1 | * | 7/2002 | Nowka et al. ................. 60/322 |

FOREIGN PATENT DOCUMENTS

JP          2195097       *   1/1990

* cited by examiner

Primary Examiner—David Bochna
(74) Attorney, Agent, or Firm—Dr. Paul Vincent

(57) ABSTRACT

A method and a device for connecting parts of an exhaust gas system which comprises at least one metal tube formed from a bellows and optionally further parts disposed coaxially within and/or outside of the bellows and at least one further system part to be connected to the metal tube, are characterized in that one end of a short connecting tube is inserted positively in an end of the metal tube and the other end is inserted positively in the system part to be connected to the metal tube, and the system part is moved to the end of the metal tube facing the system part, thereby leaving a gap, and the system part, the connecting tube and the metal tube being connected from the outside in one working step.

26 Claims, 3 Drawing Sheets

METHOD AND DEVICE FOR CONNECTING PARTS OF AN EXHAUST GAS SYSTEM

This application claims Paris Convention priority of DE 101 58 877.1 filed Nov. 30, 2001 the complete disclosure of which is hereby incorporated by reference.

BACKGROUND OF THE INVENTION

The invention concerns a method and a device for connecting parts of an exhaust gas system using at least one metal tube formed from a bellows and optionally further parts which are disposed coaxially inside and/or outside of the bellows, and at least one further system part to be connected to the metal tube.

In exhaust gas systems, in particular for motor vehicles, metal tubes are conventionally used having a woven jacket, a bellows disposed therein, an agraff-inliner, and optional further equipment. They are preferably used for tube-tube connections. A part of the exhaust gas system, e.g. a tube, is thereby inserted into the metal tube at the input and output sides and welded thereto.

A special variant of this type of connection is a flange connection structure wherein at least one end of the metal tube is provided with a system part which is configured as a connecting flange and which can be connected to the exhaust gas system at an existing point of separation.

To join the connection flange to the metal tube, the flange is conventionally pushed onto a ring provided at one end of the metal tube—without using further components—and welded to the metal tube from the inside.

This procedure precludes welding from the outside in order to guarantee reliable connection of all layers of the tube end.

Disadvantageously, in the MAG welding method (MAG= metal active gas; electric welding method with supplied welding wire which is melted-on) used therefor, welding spatters form which can deposit on the inner side of the metal tube, in particular of the agraff, since complete shielding of the inliner is thereby not possible. This is undesirable, since such material deposits have negative effects on the function of the metal tube, e.g. on its elastic properties, and can damage the engine and/or catalytic converter if they come off during operation.

To prevent these disadvantages, the welding spatters must be removed in a later, costly processing step.

For this reason, the above-described arrangement can be optionally fashioned with an additional intermediate tube disposed inside the metal tube between the connection flange and metal tube to prevent welding spatters.

Towards this end, the flange and the metal tube are pushed onto the intermediate tube and welded thereto from the outside using MAG welding.

This method is disadvantageous in that a second weld seam must be provided which increases production costs and the overall length of the arrangement is increased by approximately the length of the intermediate tube.

It is therefore the underlying purpose of the present invention to produce a method and a device for connecting parts of an exhaust gas system, which eliminate the above-mentioned disadvantages and prevent welding splatter inside of the metal tube at minimum production cost without substantially increasing the overall length of the arrangement.

SUMMARY OF THE INVENTION

This object is achieved in accordance with the invention in that one end of a short connecting tube is positively inserted into one end of the metal tube and its other end is positively inserted into the system part to be connected with the metal tube, in particular a connection flange, wherein the system part is moved to the end of the metal tube facing the system part leaving a gap therebetween, and the system part, the connecting tube and the metal tube are connected to one another from the outside in one processing step.

A short connecting tube is used instead of the intermediate tube and the system part can therefore be moved towards the end of the metal tube, leaving only a small gap. This permits connection of the system part, connecting tube and metal tube from the outside in one working step, with one single seam. External welding prevents spatters which adhere to the inside of the metal tube.

Although the seam must, in principle, extend only partially along the circumference of the connecting tube in the region of the gap (weld adhesion, interrupted weld seam), in a preferred embodiment, it extends over the entire circumference of the connecting tube in the region of the gap thereby producing a completely gas-tight connection.

One decisive standpoint of the invention consists in that all layers of the metal tube are connected. For embodiments with a weld seam connection, a particularly preferred embodiment of the invention provides that the weld seam has a specified fusion penetration in all bordering components.

To adapt the system part and metal tube to different cross-sectional combinations, the connection tube can be tapered or stepped, i.e. the two ends can have different cross-sections, wherein the tapering can be effected in the direction of gas flow or opposite thereto. In a further embodiment, the connecting tube can have a plurality of steps wherein e.g. three or more diameters are provided sequentially, which each differ from the previous diameter.

While the tube cross-sections can have any shape, such as elliptical or oval, and both ends can have different contours, in a preferred embodiment of the invention, at least one of the two facing cross-sections of metal tube and system part are circular. Both cross-sections can also be circular.

If the metal tube and the system part have identical circular cross-sections, the connecting tube is preferably a hollow cylinder with such a cross-section. When the metal tube and the system part have different cross-sections, they are adapted in accordance with the invention in that one end of the connecting tube has a first outer diameter corresponding to the inner diameter of the system part and the other end of the connecting tube has a second outer diameter which corresponds to the inner diameter of the end of the metal tube facing it, wherein the transition between first and second outer diameters of the connecting tube to a central part of the connecting tube is continuous, and in particular, the central part has a truncated conical shape.

In an extremely advantageous variant of the inventive method, in which a seal is provided between an end-side sealing surface of the system part and a counter piece opposite thereto, the seal to be inserted between the system part and the counter piece is centered wherein, in accordance with a preferred embodiment of the invention, the system part and its counter piece are preferably formed as flanges. The use of a seal, in particular of a flat seal is thereby particularly preferred in accordance with the invention.

Centering is obtained in that the connecting tube extends in the direction of the tube axis, i.e. has an axial length such that it projects past the sealing surface of the system part by an amount M which corresponds approximately to the thickness of the seal to be used. In particular, this considerably simplifies mounting of a flanged joint and seal.

With corresponding increased projecting length and suitable design of the connecting tube, the counter piece, in particular a counter flange can also be centered.

The drawing illustrates concrete embodiments of the connection produced by the inventive method. The features contained herein are the subject matter of the dependent claims.

DESCRIPTION OF THE PREFERRED EMBODIMENT

Figure 1:
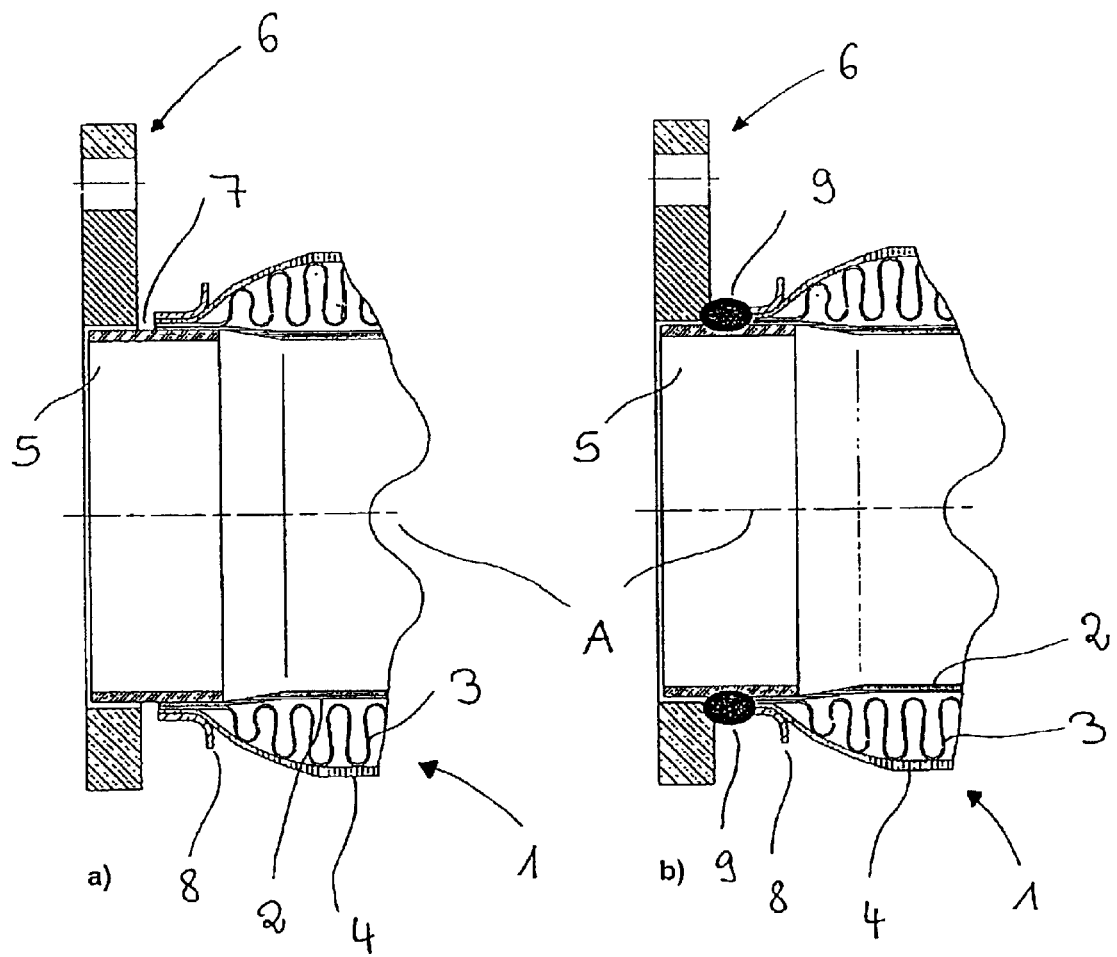
FIG. 1a shows a sectional view of the inventive connection between a metal tube and a connection flange with a cylindrical connecting tube, without seam.
FIG. 1b shows the same connection as FIG. 1a, however, with a weld seam.

FIG. 1 shows a sectional view, in a plane perpendicular to tube axis A, of a connection between parts of an exhaust gas system produced by means of the inventive method.

In the embodiment shown, the metal tube 1 comprises an agraff-inliner 2, a metal bellows 3 and an outer woven jacket 4 disposed coaxially, radially from the inside towards the outside.

A short connecting tube 5, which, in the embodiment shown, is formed as hollow cylinder with circular cross-section is positively inserted with one end in a connecting flange 6 and with the other end in the metal tube 1 such that only a small gap 7 remains between the connecting flange 6 and the metal tube 1. An angle flange 8 is also disposed at the gap-side end of the metal tube 1.

FIG. 1b shows a weld seam 9 which joins together the connecting tube 6, along its entire periphery and in the region of the gap 7, with the connecting flange 6 and all layers 2, 3, 4, 8 of the metal tube 1. Towards this end, the weld seam 9 has a certain fusion penetration in all of those neighboring components.

In the embodiment of FIG. 1, the metal tube 1 and the connecting flange 6 have substantially identically sized (circular) cross-sections such that, in accordance with the inventive method, a hollow-cylindrical connecting tube 5 with identical cross-section is used. The (identical) inner diameters of the metal tube 1 and of the connecting flange 6 correspond to the outer diameter of the connecting tube 5.

Figure 2:
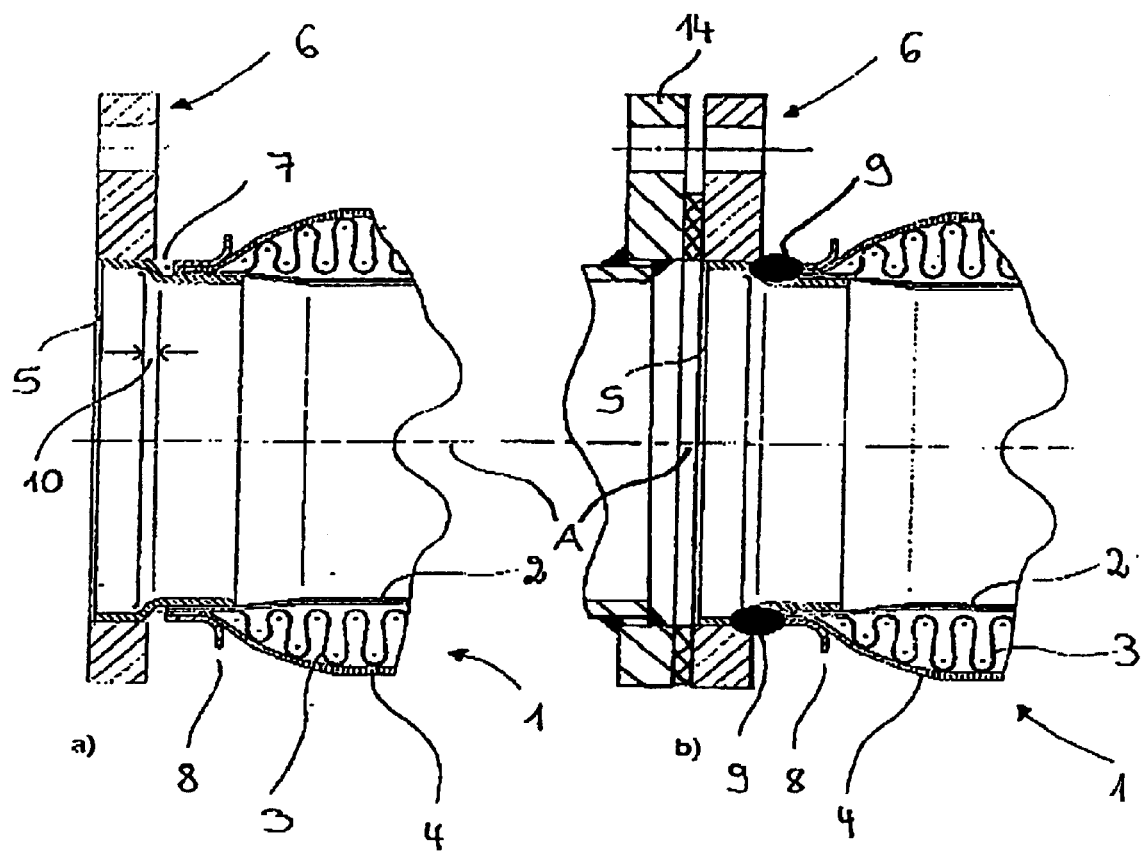
FIG. 2a shows the same connection as FIG. 1a, however, with a stepped or tapered connecting tube.
FIG. 2b shows the same connection as FIG. 2a, however with a weld seam.

FIG. 2 is a sectional view as in FIG. 1 showing, however, a connection produced with the inventive method for an embodiment in which the metal tube 1 and the connecting flange 6 have different inner cross-sections or diameters. The connecting tube 5 is designed correspondingly such that one end has an outer diameter corresponding to the inner diameter of the metal tube 1 and its other end has an outer diameter which corresponds to the inner diameter of the connecting flange 6. The transition from one diameter to the other is continuous in a central region 10 of the connecting tube 5 which is located approximately in the region of the gap 7. In the concrete embodiment shown, the metal tube 1 and connecting flange 6 each have circular cross-sections and the connecting tube 5 has a truncated conical shape in the central region 10. The connecting flange 6 joins onto a counter piece 14.

Figure 3:
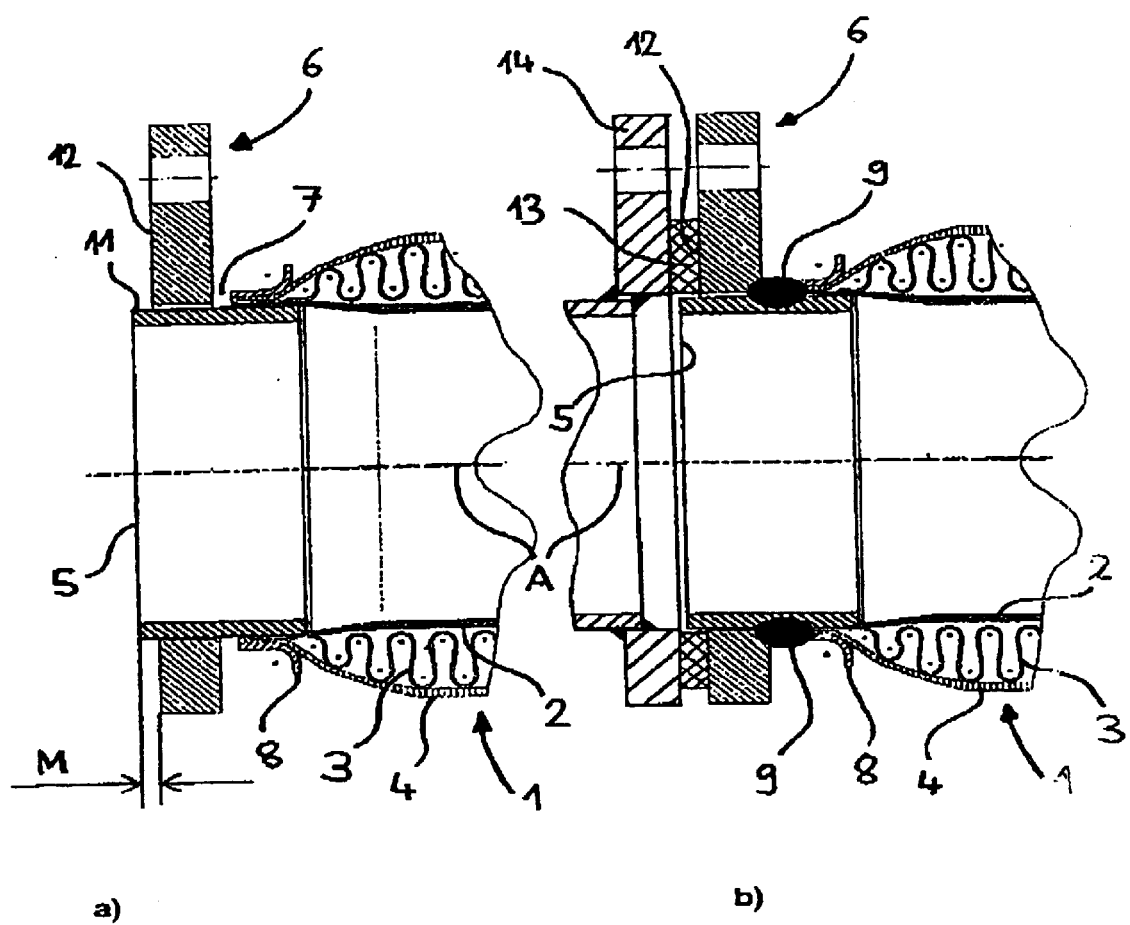
FIG. 3a shows the same connection as FIG. 1a, however, with an extended connecting tube providing additional centering.
FIG. 3b shows the same connection as FIG. 3a, however, with a weld seam and a centered flat seal.

FIG. 3 shows a sectional view corresponding to FIGS. 1 and 2 of a connection produced with the inventive method comprising a connecting tube 5 which projects 11 past a sealing surface 12 of the connecting flange 6 on a side of the connecting flange 6 facing the metal tube 1. This projecting length 11 of the connecting tube 5 has a length M.

FIG. 3b shows an additional flat annular seal 13 which is pushed onto the connecting tube 5 at its projecting region 11 and against the sealing surface 12 of the connecting flange thereby centering it via the connecting tube 5. The thickness of the flat seal 13 corresponds substantially to the length M of the projecting length 11. The seal 13 is disposed between the connecting flange 6 and counter piece 14.

All three figures, in particular the respective partial figures b, clearly show that the inventive method produces a device for connecting parts of an exhaust gas system which requires only one seam 9 for secure connection of the relevant components 1, 5, 6 and which moreover ensures that during production, no material is deposited and accumulates within the metal tube 1 which would impair subsequent operation of the exhaust gas system.

List of Reference Numerals
1 metal tube
2 agraff-inliner
3 bellows
4 woven jacket
5 connecting tube
6 system part (connecting flange)
7 gap
8 angle flange
9 (weld) seam
10 truncated central region
11 projection
12 sealing surface
13 (flat) seal
14 counter piece
A tube axis
M length of projection

I claim:

1. A method for connecting together parts of an exhaust gas system, said exhaust gas system comprising at least one metal tube having a bellows and optional additional components disposed inside and/or outside of and coaxially to the bellows, and at least one further system part to be connected to the metal tube, the method comprising the steps of:
   a) inserting, in positive fit, a first end of a short connecting tube into a first end of said metal tube;
   b) inserting, in positive fit, a second end of said short connecting tube into said system part such that said system part is thereby positioned proximate said first end of said metal tube to define a gap between said system part and said first end of said metal tube; and
   c) connecting together said system part, said connecting tube, and said metal tube, from an outside thereof, in one single processing step.

2. The method of claim 1, wherein step c) is effected through welding.

3. The method of claim 2, wherein step c) is effected through MAG welding.

4. The method of claim 2, wherein step c) comprises the step of connecting together said bellows and said optional additional components such that said metal tube, said system part and said connecting tube are fusion-penetrated by said welding.

5. The method of claim 1, wherein said first end of said short connecting tube has a first cross-section which differs from a second cross section of said second end of said short connecting tube to connect said metal tube and said system part when said metal tube and said system part have differing cross-sections.

6. The method of claim 1, wherein said second end of said short connecting tube has a length in a direction of a tube axis which is longer than an extension of said system part, wherein said connecting tube projects past an end of said system part facing away from said metal tube by an amount which is suitable for centering a seal.

7. The method of claim 6, further comprising the step of centering a second system part disposed downstream of said system part through appropriate increase in said length of said connecting tube and appropriate design of said connecting tube.

8. A device for connecting together parts of an exhaust gas system, the device comprising:
at least one metal tube having a bellows and optional additional components disposed inside and/or outside of and coaxially to the bellows;
a short connecting tube having a first end for insertion, in positive fit, into a first end of said metal tube;
at least one further system part to be connected to the metal tube, said further system part accepting, in positive fit, a second end of said short connecting tube to position said system part proximate said metal tube for defining a gap between said system part and said metal tube; and means for connecting together said system part, said connecting tube, and said metal tube, from an outside thereof, in one single processing step, wherein both facing cross-sections of said metal tube and system part have different diameters, said second end of said connecting tube having a second outer diameter corresponding to an inner diameter of said system part and said first end of said connecting tube having a first outer diameter corresponding to an inner diameter of said first end of said metal tube, wherein a transition between said first and said second outer diameters of said connecting tube to a central region of said connecting tube is continuous.

9. The device of claim 8, wherein said connecting means define one single seam spanning said gap.

10. The device of claim 9, wherein said seam extends over an entire periphery of said connecting tube in a region of said gap.

11. The device of claim 9, wherein seam is a weld seam.

12. The device of claim 11, wherein said weld seam has a specified fusion penetration in said metal tube, said connecting tube, and said further system part.

13. The device of claim 9, wherein said first and said second end of said connecting tube have different cross-sections for adaptation to different cross-sectional combinations between said metal tube and said system part.

14. The device of claim 9, wherein at least one of two facing cross-sections of said metal tube and said system part is circular.

15. The device of claim 14, wherein both facing cross-sections of said metal tube and said system part are circular.

16. The device of claim 15, wherein said two facing cross-sections of said metal tube and said system part have identical diameters.

17. The device of claim 16, wherein said connecting tube is formed as a hollow cylinder with circular cross-section.

18. The device of claim 8, wherein said transition of said connecting tube has a shape of a truncated conical central region.

19. The device of claim 9, wherein said connecting tube has an axial length to project by an amount past an end of said system part on a side of said system part facing away from said metal tube.

20. The device of claim 19, wherein said projecting amount approximately corresponds to a thickness of a seal to be used between said system part and a counter piece.

21. The device of claim 20, wherein said seal to be used between said system part and said counter piece is centered by said projecting end of said connecting tube.

22. The device of claim 20, wherein said projecting amount of said connecting tube is selected such that said counter piece is centered thereby.

23. The device of claim 20, wherein said seal is formed as a flat seal.

24. The device of claim 9, wherein said system part is formed as a connecting flange.

25. The device of claim 24, comprising a counter piece cooperating with said connecting flange, said counter piece defining a counter flange.

26. The device of claim 9, wherein said metal tube comprises, at least one of a woven jacket disposed outside of said bellows, an agraff-liner disposed inside said bellows, and an angle flange.

* * * * *